(12) United States Patent
Russ

(10) Patent No.: US 12,296,953 B2
(45) Date of Patent: May 13, 2025

(54) AIRCRAFT WITH WINGTIP POSITIONED PROPELLERS

(71) Applicant: Jonathan Christian Russ, Poway, CA (US)

(72) Inventor: Jonathan Christian Russ, Poway, CA (US)

( * ) Notice: Subject to any disclaimer, the term of this patent is extended or adjusted under 35 U.S.C. 154(b) by 0 days.

(21) Appl. No.: 18/239,039

(22) Filed: Aug. 28, 2023

(65) Prior Publication Data

US 2023/0406498 A1  Dec. 21, 2023

Related U.S. Application Data

(63) Continuation of application No. 17/257,399, filed as application No. PCT/US2020/067536 on Dec. 30, 2020, now Pat. No. 11,738,868.

(60) Provisional application No. 62/956,227, filed on Dec. 31, 2019.

(51) Int. Cl.
  *B64C 39/12* (2006.01)
  *B64C 29/00* (2006.01)
  *B64C 39/08* (2006.01)

(52) U.S. Cl.
  CPC .......... *B64C 39/12* (2013.01); *B64C 29/0025* (2013.01); *B64C 39/08* (2013.01)

(58) Field of Classification Search
  CPC ..... B64C 39/12; B64C 29/0025; B64C 39/08; B64C 39/068; B64C 29/0033
  See application file for complete search history.

(56) References Cited

U.S. PATENT DOCUMENTS

| | | | | |
|---|---|---|---|---|
| 5,046,684 A | * | 9/1991 | Wolkovitch | B64C 39/068 244/45 R |
| 5,503,352 A | * | 4/1996 | Eger | B64C 39/12 244/45 R |
| 6,474,604 B1 | * | 11/2002 | Carlow | B64C 39/062 244/45 R |
| 2014/0061367 A1 | * | 3/2014 | Fink | B64C 27/26 244/6 |
| 2017/0001723 A1 | * | 1/2017 | Tanahashi | G05D 1/0094 |

FOREIGN PATENT DOCUMENTS

RU      2667433 C2 *  9/2018

OTHER PUBLICATIONS

Machine translation of reference Durov (Pub No. RU-2667433-C2) Pub date Sep. 19, 2018. (Year: 2018).*

* cited by examiner

*Primary Examiner* — Rodney A Bonnette
(74) *Attorney, Agent, or Firm* — Donn K. Harms

(57) ABSTRACT

An aircraft is provided which includes a fuselage having a first wing with curved wingtips positioned above a second wing having curved wingtips. Rotor assemblies located in between the curved wingtips of the first and second wing, are employable to both provide vertical thrust for vertical take off of the aircraft and auto rotation to generate electric energy to recharge an onboard electric power supply. The first wing may be formed in a V-shape, and additional rotor assemblies to provide forward and vertical thrust to the airplane can be included on rotatable canards.

8 Claims, 7 Drawing Sheets

AIRCRAFT WITH WINGTIP POSITIONED PROPELLERS

This application is a Continuing patent application of U.S. patent application Ser. No. 17/257,399 filed on Dec. 31, 2020, which is a National Stage patent application based on International Patent Application number PCT/US20/67536 filed on Dec. 30, 2020, which claims the benefit of U.S. Provisional Patent Application 62/956,227 filed on Dec. 31, 2019.

BACKGROUND OF THE INVENTION

1. Field of the Invention

The present invention relates generally to aircraft and propellers employed therewith. More particularly, it relates to a wingtip positioned propeller operatively engaged to an electric motor generator. This motor generator is configured to both provide thrust to the aircraft for flight and to capture wingtip vortex energy and convert such to electric power during periods of flight of the aircraft.

2. Prior Art

In recent years with the advent of drone aircraft, many subsonic conventional and runway and vertical take-off air vehicles are propeller-driven for efficiency. On such aircraft, the propeller is engaged with a rotating hub which has radially projecting blades which produce lift and drag depending on the operation of the engaged motor. The propeller converts rotational power from an electric motor operatively connected to a power source to linear thrust force to propel the air vehicle upward and forward depending on the operation thereof at the time.

Such a thrust producing propeller, when operatively powered by an electric power source such as a battery and/or slow discharge capacitors, gradually increases airflow and reduces air pressure up to the propeller plane. Upon reaching the plane of the rotating propeller, the air pressure is increased abruptly in a downstream flow which decreases gradually as it reduces to the freestream value.

Such lightweight drones or remotely controlled aircraft in recent years operate in a vertical take-off and landing during operation thereof. However, when equipped with landing gear, such vehicles are easily operated in a conventional runway take-off and landing operation.

In the vertical operation, such aircraft conventionally employ at least one and preferably a plurality of propellers operatively engaged to electric motors. The propellers in this vertical take-off and landing operation are oriented to produce thrust force in a vertical direction.

During movement vertically, control of the vehicle requires the generation and varying of thrust across multiple rotors and/or control of the rotor blade pitch angles. To transition from vertical to horizontal flight some aircraft tilt the thrust producing component or the entire vehicle, while other lightweight aircraft employ separate motor-driven propellers for each mode of flight.

All these systems require controllers to maintain the aircraft in a flight producing orientation and control the various wing surfaces and propellers to maintain the aircraft airborne and to moving vertically and horizontally during flight.

With respect to the above, before explaining at least one preferred embodiment of the aircraft system with wingtip-positioned propeller herein, it is to be understood that the disclosed device and system are not limited in application to the details of employment and to the arrangement of the components or the steps set forth in the following description or illustrated in the drawings. The various apparatus and operations of the herein disclosed aircraft system herein are capable of other embodiments, and of being practiced and carried out in various ways, all of which will be obvious to those skilled in the art once the information herein is reviewed.

Also, it is to be understood that the phraseology and terminology employed herein are for the purpose of description, and should not be regarded as limiting. As such, those skilled in the art will appreciate that the conception upon which this disclosure is based, may readily be utilized as a basis for other aircraft having wingtip-positioned propellers operatively engaged with wingtip engaged motor generators. It is important, therefore, that the embodiments, objects and claims herein, be regarded as including such equivalent construction and methodology insofar as they do not depart from the spirit and scope of the present invention.

SUMMARY OF THE INVENTION

In recent years, lightweight propeller-driven aircraft have become widely employed for both hobby and work such as aerial observation, surveying and photography and the like. Newer designs have shown great promise in providing transportation of both freight and persons between multiple locations, especially where vertical take-off and landing (VTOL) is employed.

The aircraft and system herein, is configurable to operate in the various modes of the system and method herein, to provide for faster cruise speeds in combination with the ability for longer flight and coasting times. Additionally, the aircraft configuration and system of operation, herein, provides for an extension of both the range and flight abilities of such aircraft.

In a particularly preferred mode of the aircraft system herein, flight range extension is provided by the inclusion of wingtip positioned propellers, each of which are operatively engaged to an electric motor generator. By wingtip positioned propellers is meant herein, that a propeller is operatively engaged to a motor generator, and is positioned between respective curved wingtips of both a first overhead wing and wingtip of a second wing which is positioned below the first or overhead wing. The wingtip positioned propellers engaged to respective motor generators, rotate in a substantially horizontal plane. By substantially horizontal plane is meant that the plane of rotation of each wingtip position propeller is within twenty degrees of a plane of the first and/or second wing.

So positioned, in between the respective curving wingtips, each propeller may be operated when powered by an onboard electric supply to provide lift to the aircraft. When not so powered, the propellers, being operatively located between the two respective curved wingtips, operate to capture vortex energy from the tips of both the first and second wing. This vortex energy operates to rotate each propeller and an operatively engaged motor generator to harvest wind energy and convert it to electric energy to recharge the onboard electric supply. Such onboard electric supplies are well known such as one or a combination of operatively connected batteries and/or capacitors.

In addition to capturing the vortex energy generated at each of the wingtips during periods of horizontal flight, it has been found in experimentation that the propellers located at the wingtips will also capture wind forces generated from vortices from wings and canards, and also prop wash slipstream from the canard engaged propellers as well as environmental wind. Such wingtip positioning thus provides multiple means to generate and store electricity to the onboard power supply.

Further, the wingtip positioning of propellers engaged to respective motor generators may also be operated to essentially provide regenerative braking or auto rotation during a forward moving descent of the aircraft. Such will occur during auto rotation of each wingtip-positioned propeller from airflow generated during descent of the aircraft. This propeller rotation will thereby rotate the engaged motor generators to generate an electric current which may be communicated to the onboard electric supply to recharge it.

In addition to the noted and preferred wingtip positioned horizontally oriented propellers operatively engaged with respective motor generators, in a particularly preferred mode of the aircraft herein, the aircraft may include motor generator driven propellers engaged upon rotatable front-positioned canards. While such motor driven propellers might simply be engaged to a wing, positioning them on canards which are engaged to the fuselage and located thereon forward of both the first or overhead wing and second wing, allow for larger diameter horizontally rotating propellers at the wingtips, as well as thrust directional control using actuators to rotate the canards.

So positioned, both canards are rotatable in their engagement to the fuselage to thereby rotate the plane of each propeller operatively connected to a motor generator attached to each canard. For vertical take off and landing, the plane of each canard-engaged propeller may be rotated, by rotating the respective canard, to move the plane of the propeller thereon between a vertical plane to a substantially horizontal plane of positioning. By substantially horizontal plane of positioning of the propellers is meant the plane of the rotating canard engaged propellers are substantially parallel to plane of the first wing and/or second wing. By a vertical plane of positioning of the canard engaged propellers is meant that the plane of rotation of each such propeller is normal to or substantially perpendicular to the plane of the first wing and/or second wing. Thus, rotation of each canard will rotate the motor generator thereon, which in turn will rotate the plane of rotation of the respective propeller engaged to the respective motor generator.

For horizontal or forward flight, the canards are rotatable to move the plane of the engaged propellers between the substantially horizontal plane to a substantially vertical rotational plane of each canard-engaged propeller. Rotation of each canard thereby rotates the motor generator engaged thereto and in turn the plane of the propeller engaged to the motor generator engaged to the respective canard.

In the mode of the aircraft herein, having a motor generator thereon, with a respective propeller operatively engaged to each respective canard engaged motor generator, the canards can be rotated by a controller. During such rotation, each propeller can be concurrently rotated between the substantially horizontal plane and the substantially vertical plane of rotation, as needed for the particular moment in flight. This rotation of the plane of each propeller can, thus, be controlled to provide lift and/or forward propulsion as needed by the aircraft during a period of take-off, forward propulsion, or landing. Software running on or in operative communication with the controller can operate actuators or motors to rotate each of the canards to provide the required lift and/or forward thrust during any period of the flight of the aircraft. Because the wingtip positioned propellers auto rotate when unpowered, they constantly provide lift which can generate significant resistence to the aircraft stalling.

As can be discerned, for a vertical take-off and landing, the plane of rotation of the canard engaged propellers can be substantially horizontal such as the plane of rotation of the wingtip engaged propellers. Such an orientation allows for thrust from four propellers to lift the aircraft during take off, and auto rotation of the four propellers to slow the descent during landing.

Once elevated, the plane of rotation of the canard engaged propellers can be rotated by the controlled rotation of an actuator engaged with each of the canards, to thereby position the canard engaged propellers to a plane of rotation to provide forward thrust for the aircraft and thereby generate lift from the first and second wings during flight. During a vertical take off and landing (VTOL), the two canard-engaged propellers are rotated back to a substantially horizontal plane of rotation, and the motor generators engaged with them will be powered by the onboard power supply to rotate the engaged propellers during decent and/or vertical take off. The motor generators engaged with the two wingtip-positioned propellers are also energized by the onboard power supply during VTOL.

Additionally, during horizontal flight of the aircraft, the two motor generators engaged with the wingtip positioned propellers are unpowered and will during such flight auto rotate. When conducting the sinusoidal regeneration flight path, noted herein, the canard engaged motor generators will be powered to generate thrust from the attached propellers until the apogee of the flight path. At the apogee, electric power to the canard engaged motor generators is cut on the decent. This will allow the propellers on the motor generators engaged to the canards, to auto rotate against the relative wind created by gravity accelerating the aircraft downward. Such will impart rotation to the engaged motor generators which can be employed to generate electricity which is communicated to the onboard power supply. At the bottom of the descent, electric power from the onboard power supply can be reconnected to the motor generators engaged upon the two canards, to rotate the propellers engaged therewith in order to provide forward thrust to allow the aircraft to climb back to the apogee.

An additional mode of the aircraft device herein will feature the first or overhead wing, having a V-shape or configuration. In this V configuration, a central portion of the first or overhead wing is engaged to the vertical stabilizer or tail extending from the rear end of the aircraft fuselage. From the central portion, this first or overhead wing will extend in a V-shape when viewed from above, toward the front end of the fuselage where the canard is engaged to respective curved wingtips. The curved wingtips of the V-shaped wing are in a connection to one side of the wingtip positioned motor generator and propellers, such as by a connection to a bearing around which the wingtip positioned propellers rotate, or to a housing of the motor generator or in any fashion to hold the motor generator in a fixed position, and allow the engaged propeller to rotate. Such of course may vary depending on the curve of respective wingtips, the material forming them, and other factors as would occur to those skilled in the art.

In experimentation, it was found that this V-shaped first or an overhead wing provided additional lift during forward flight, from that of a linear wing, since it has a longer length than a wing projecting substantially normally or only at a slight angle, from the fuselage. It was unexpectedly found that the V-shaped first wing rendered the aircraft easier to steer during flight. This easing of the force required for steering has been attributed from further testing to the fact the V-shaped first wing directs more air toward the tail or vertical stabilizer during forward flight, which subsequently required less electric power to move the flaps to steer the aircraft which saved power and elongated the flight time from that provided with a substantially straight wing projecting substantially normal relative to the fuselage axis.

Thus, in one mode of the aircraft herein, a substantial gain is provided by positioning motor generators engaged to propellers rotating in a horizontal plane, at the intersection of curved wingtips, to capture vortex energy during flight to recharge the onboard power supply, and to generate electric power during aircraft decent to recharge the onboard power supply. In a second mode of the aircraft herein, the addition of the canard engaged motor generators with propellers which can vary in plane of rotation by a controlled rotation of the canards, provided for additional power generation during vertical decent, and the ability to provide thrust for a vertical take-off. In yet another preferred mode of the invention herein, the addition of the V-shaped first or overhead wing to the overall configuration, increased overall lift during forward flight and lessened the power needed to steer the aircraft, thereby elongating the electric power available for longer flights.

With respect to the above description, before explaining at least one preferred embodiment of the herein disclosed aircraft having wingtip positioned propellers engaged to motor generators in detail, it is to be understood that the invention is not limited in its application to the details of construction and to the arrangement of the components in the following description or illustrated in the drawings. The invention herein described, is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based, may readily be utilized as a basis for designing of other wingtip positioned propeller driven aircraft structures, as well as canard engaged propellers and methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, the term "substantially" if not otherwise defined for size or dimension or positioning of a specific part or configuration, means plus or minus ten percent.

It is an object of this invention to provide for the capture of wind vortex energy, propwash slipstream energy from the drive rotors and environmental wind during flight of an aircraft to generate electric power, through the positioning of wingtip engaged motor generators operatively connected to propellers.

Another object of this invention is to provide for the capture of wind energy during descent of an aircraft through the wind powered rotation of wingtip-positioned motor generators operatively engaged to propellers, which will auto rotate during decent and generate electricity.

An additional object of the invention herein is the provision of rotatable canards engaged to the fuselage which are controllable to rotate motor generators operatively connected to propellers, and thereby rotate the plane of rotation of the propellers for both vertical and horizontal flight.

Yet another object of the invention herein is the provision of a dual winged aircraft having a first or overhead wing in a substantially V-shape, to increase the airflow during flight to the horizontal stabilizer or tail.

Other objects, features, and advantages of the present aircraft, as well as the advantages thereof over existing prior art, will become apparent from the description to follow, and are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the various mode of the aircraft invention herein which as noted may be employed singularly or in combination. It is intended that the embodiments and figures disclosed herein are to be considered illustrative rather than limiting.

In the drawings:

FIG. 1 shows a front perspective view of the aircraft system herein showing a preferred configuration with motor generators engaged with propellers positioned between the curved wingtips of a first or overhead wing and a second wing located below the first wing, and showing a V-shaped configuration of the overhead or first wing.

FIG. 2 is an overhead or plan view of the aircraft herein showing a V-shaped first or overhead wing and showing the horizontal plane of rotation of the wingtip positioned propellers engaged to motor generators, and depicting the canards rotated to a position where motor generators engaged to the canards have the propellers engaged to the motor generators in a substantially vertical plane of rotation.

Figure 1:
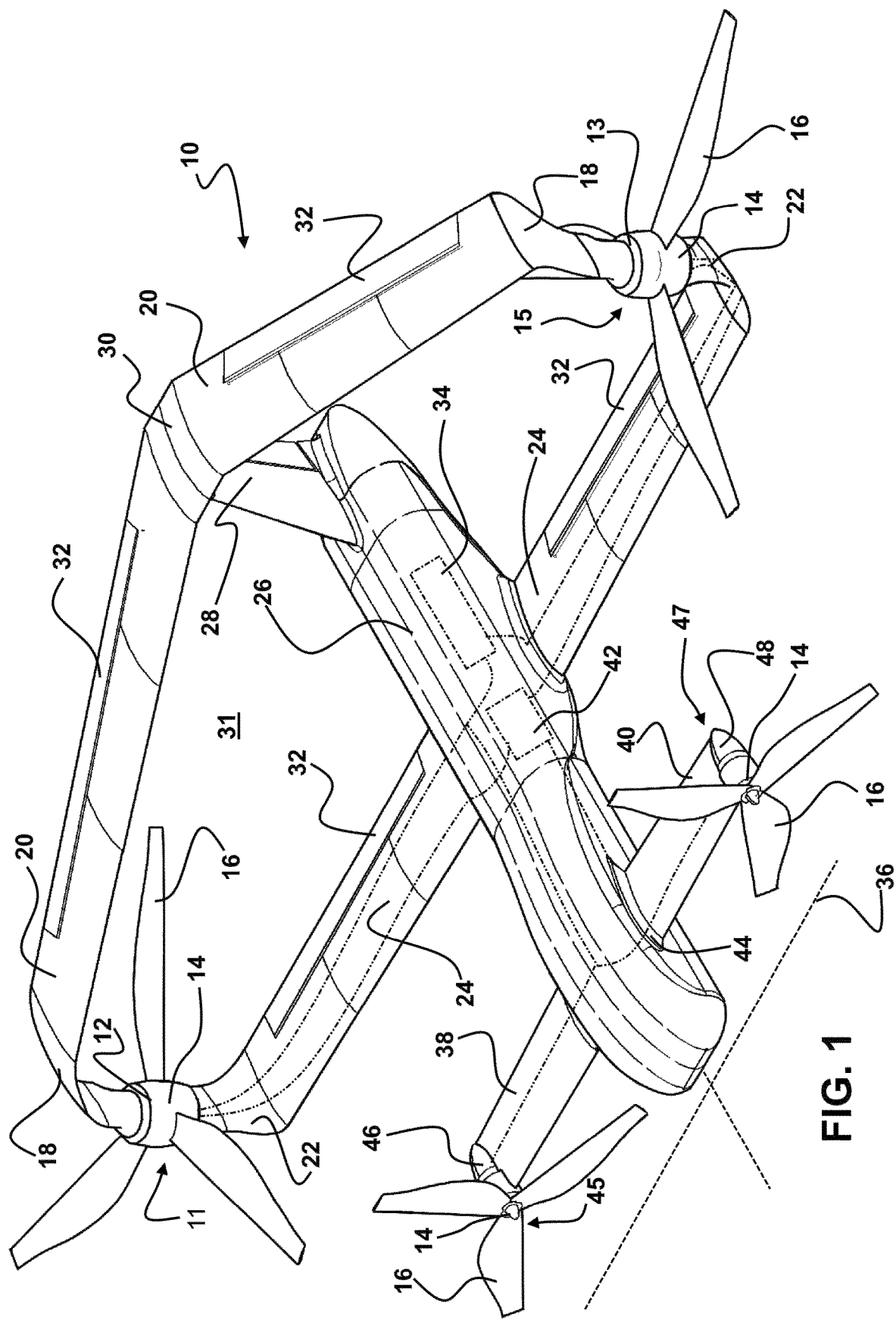

Other aspects of the present aircraft system herein shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right, first, second, and other such terms refer to the device as it is oriented and appears in the drawings and are used for convenience only, and they are not intended to be limiting or to imply that the aircraft device has to be used or positioned in any particular orientation.

Now referring to drawings in FIGS. 1-7, wherein similar components are identified by like reference numerals, there is seen in FIG. 1 a front perspective view of the aircraft system 10 herein showing a preferred configuration of having rotor assemblies which include motor generators 12 and 13, operatively connected to propellers 14 having a plurality of blades 16 thereon.

In a particularly preferred mode of the system 10, a first rotor assembly 11 having first motor generator 12 operatively engaged to a propeller 14 having blades 16, and a second rotor assembly 15 having a second motor generator 13 operatively engaged with a propeller 14 having blades 16, are both operatively positioned in a respective engagement between the first curved wingtips 18 of a first wing 20 or overhead wing, and the second curved wingtips 22 of a second wing 24 which is positioned below the first wing 20. As shown, the first rotor assembly 11 with motor generator 12 is located on the starboard side of the fuselage 26 and the second rotor assembly 15 having the second motor generator 13, is positioned on the port side of the fuselage 26.

As shown, both the first rotor assembly 11 and the second rotor assembly 15, are respectively positioned in an engagement located between the distal ends of the first curved wingtip 18 at opposite ends of the first wing 20 and the distal ends of the second curved wingtips 22 at the respective opposite ends of the second wing 24. Such a connection of the curved wingtips 18 and 22 to the first rotor assembly 11 and second rotor assembly 15, may be to the housing of the respective motor generator 12 or 13, or may be a connection of one or both curved wingtips 18 and 20 to a housing surrounding the motor generators 12 and 13, or may employ fasteners or connectors therebetween, or might be a connection of one curved wingtip 18 to a bearing or mount around which the propeller 14 rotates, and the other wingtip 22 to the exterior of the motor generator 12 or 13. Thus, by the term connection of either of the first rotor assembly 11 and the second rotor assembly 15, each having a respective motor generator engaged with a propeller, in between both wingtips 18 and 20 is meant, that the respective motor assembly 11 and 15, is held secure and fixed in position which allows the propeller 14 in operative engagement to a motor generator, sufficient area to rotate in a horizontal plane of rotation which extends into a space 31 in between the first wing 20 and second wing 24.

Propellers 14 operatively engaged with the first rotor assembly 11 and second rotor assembly 15, will rotate blades 16 engaged thereon in a substantially horizontal plane when the motor generators 12 and 13 are in an energized mode and being supplied electric power from an onboard power supply 34. As noted, this horizontal plane extends into the space 31 between the two wings on one side of both of the rotor assemblies.

During periods of forward flight of the aircraft, vortex airflow generated at the ends of both the first wing 20 and second wing 24 where they are engaged to curved wingtips, may impart rotational force to the blades 16 and propellers 14. This rotational force will spin both the first motor generator 12 of the first rotor assembly 11 and second motor generator 13 of the second rotor assembly 15, whereby they will generate eclectic energy which is communicated to the power supply 34 to help recharge it.

During descent of the aircraft in a landing, airflow communicating against the blades 16 of the propellers 14 will impart force to rotate the first motor generator 12 and second rotator generator 13 whereby both auto rotate to slow decent while concurrently generating electric power which can be communicated to the power supply 34. As noted, the power supply 34 may be one or a combination of batteries and/or capacitors or other electric power storage reservoirs as are well known in the art, and is operatively connected to send and receive electrical power through wired connections to the first motor generator 12, second motor generator 13, and to a third rotor assembly 45 having a third motor generator 46 and a fourth rotor assembly 47 having a fourth motor generator 48.

While the aircraft herein is depicted with a third rotor assembly 45 and a fourth rotor assembly 47, engaged to canards 38 and 40 at a front portion of the fuselage 26, to provide forward thrust to the aircraft for horizontal flight, the aircraft may operate without the canards 38 and 40 and still gain significant utility from the configuration of two wings having the first rotor assembly 11 and the second rotor assembly 15 mounted therebetween at the curved wingtips. As such, a third rotor assembly 45 can be operatively connected to the aircraft to provide forward thrust for horizontal flight in a mode of the aircraft system 10 herein which still gains power generation and lift from the spinning of the propellers 14 on the first rotor assembly 11 and second rotor assembly 15 as described herein. This would eliminate the canards 38 and 40 and still provide significant electric power generation and lift during auto rotation of the horizontally rotating propellers 14 of the first rotor assembly 11 and second rotor assembly 15.

Figure 2:
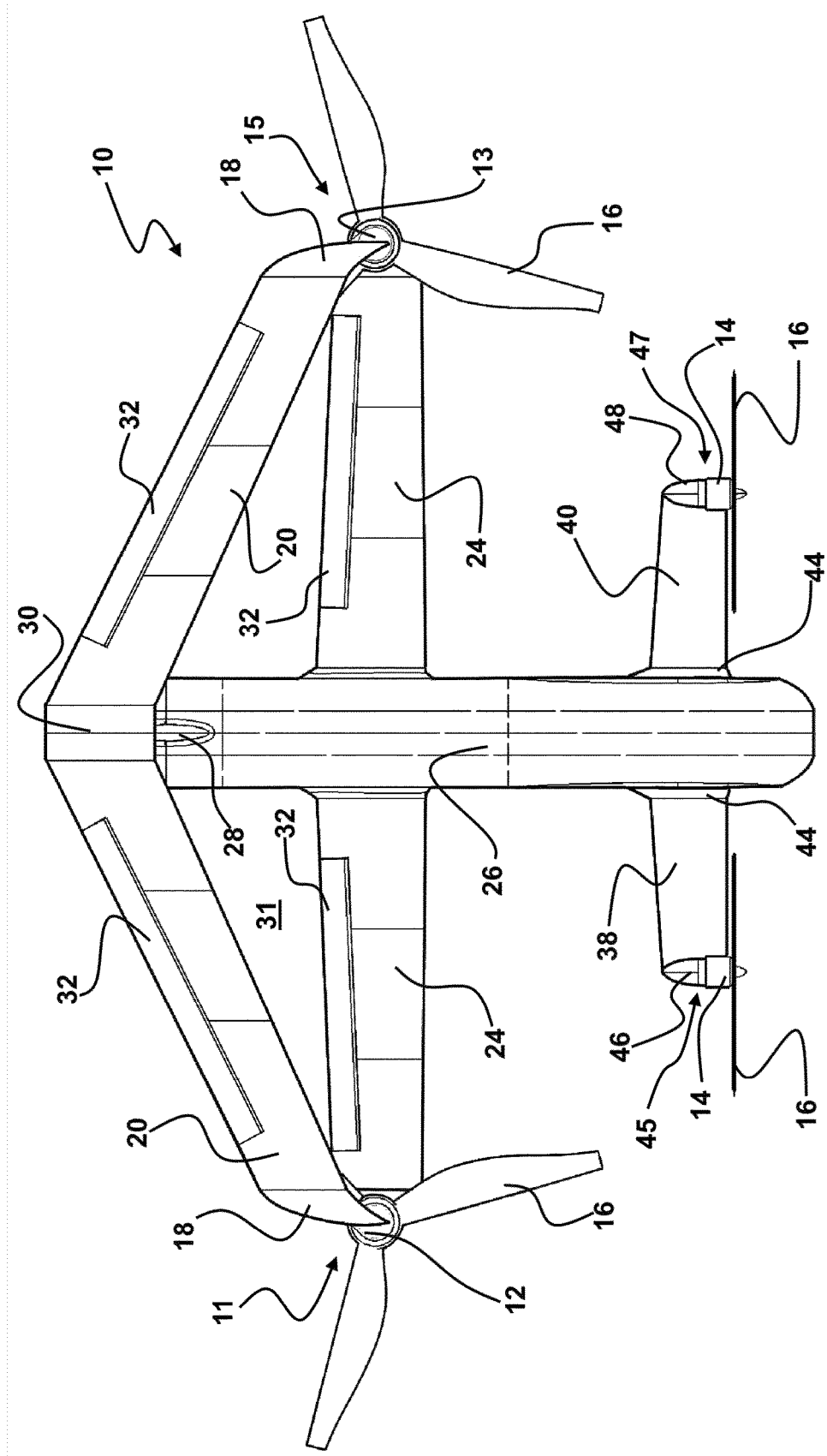
Figure 3:
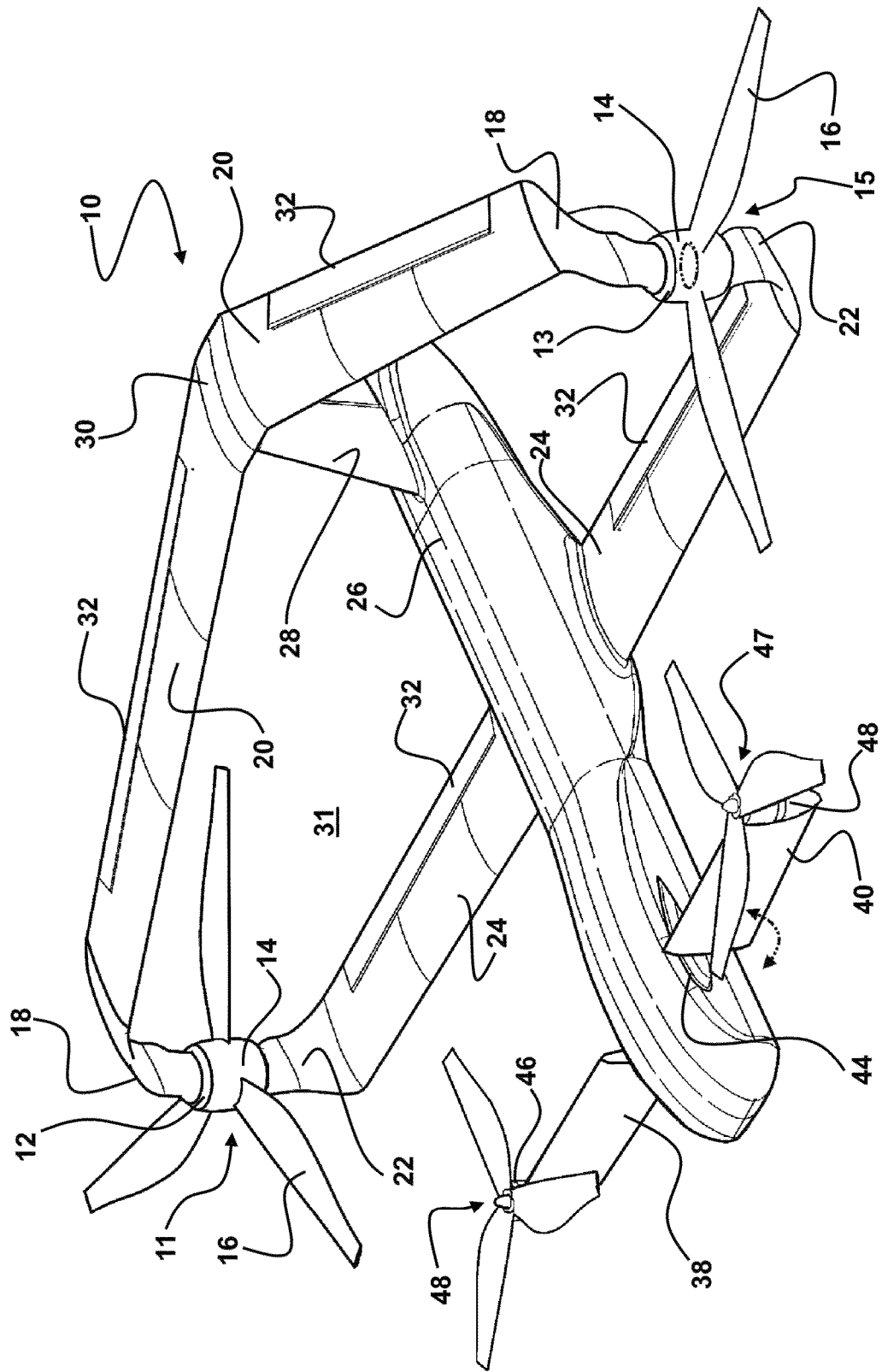
FIG. 3, depicts the aircraft system of FIGS. 1-2 but showing the canards rotating from the horizontal positioning of FIG. 1, toward a vertical positioning whereby the canard connected propellers can be positioned to rotate in either a vertical plane of rotation or horizontal plane or various rotational planes therebetween.

As shown in the FIGS. 1-3, at a rear of the aircraft fuselage 26 is positioned a tail or horizontal stabilizer 28 upon which a central portion 30 of the first wing 20 is operatively connected. Both the first wing 20 and the second wing 24 are shown as having control surfaces such as flaps 32 and can include other conventional control surfaces as would occur to those in the art.

Figure 4:
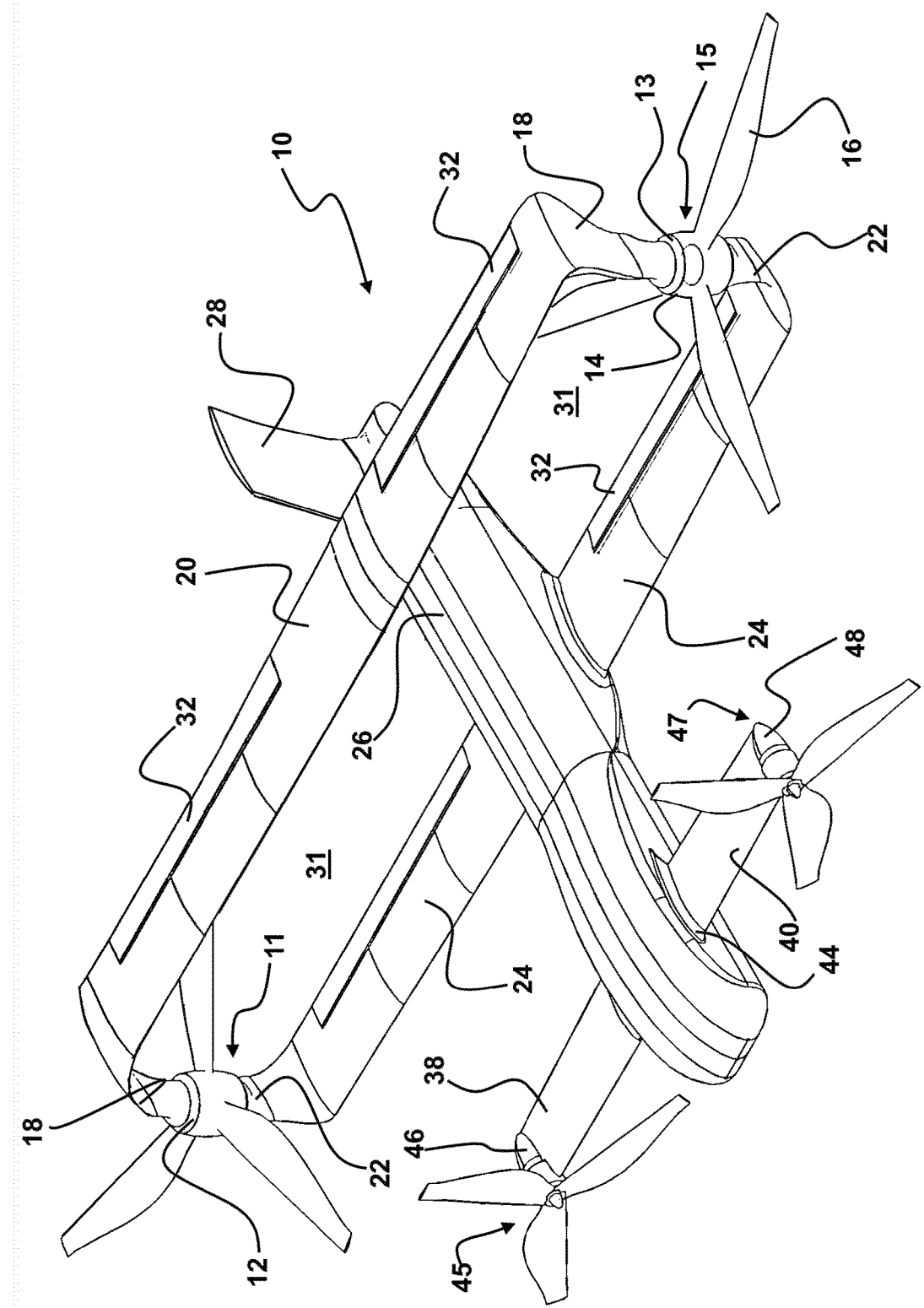
FIG. 4 depicts the aircraft system herein in a fashion similar to that of FIGS. 1-3, but showing the first or overhead wing in extending substantially normal to the axis of the fuselage.

The aircraft system 10 herein will work well with any aircraft having a first wing 18 with first curved wingtips 18 and a second wing 24 having second curved wingtips 22, where the first rotor assembly 11 and second rotor assembly 15 are engaged between the respective distal ends of first curved wingtips 18 at opposite ends of the first wing 20 which curve toward the second wing 24, and second curved wingtips 22 at opposite ends of the second wing 24 which curve upward toward the first wing 20. Such a configuration is shown in FIG. 4 enlarged, and in FIGS. 1-3.

Of course other configurations as would occur to those skilled in the art where the first curved wingtips 18 of a first wing 20 and second curved wingtips 22 of a second wing 24 in respective curves toward each other, respectively engage with a first rotor assembly 11 and second rotor assembly 15. In such engagement each of the rotor assemblies 11 and 15 will have propellers 14 rotating in a horizontal plane extending into a space 31 in between the first wing 20 and second wing 24, will gain the benefits noted herein and are considered included in the claims herein.

Particularly preferred, as shown in FIGS. 1-3, are a configuration of the first wing 20, in a substantially V-shape. This V-shaped first wing 20 as noted above, has shown to provide additional benefits by enhancing steering of the aircraft by directing horizontal airflow running over a top surface of the second wing 24 and under the first wing 20, toward the horizontal stabilizer 28. The increased airflow contact has shown in experimentation to make it easier to steer the aircraft and to maintain it more stabilized in the horizontal plane 36 which is substantially aligned with or running substantially parallel to the plane of the second wing. Consequently, inclusion of this V-shaped first wing 20 as an addition to the wingtip positioned first motor generator 12 and second motor generator 13 further enhances performance of the aircraft.

Additionally shown in FIG. 1, and providing additional utility for VTOL and forward thrust, are a starboard canard 38 and a port canard 40 each of which may be configured to rotate 360 degrees. A controller 42 is in operative communication with a canard actuator 44 or motor which provides for concurrent rotation of both the starboard canard 38 and port canard 40 as shown in FIG. 3. Such controllers 42 are widely available and employed and can include gyroscopes, accelerometers, magnetometers, and other components which allow it to calculate and adjust the positioning of the aircraft by adjusting the canard 38 and 40 positioning, the propeller speed of all propellers, and adjusting control surfaces such as flaps 32 prior to and during flight. The controller 42 may be onboard or in operative communication with control actuators and the like on the aircraft.

The controlled rotation allows both canards 38 and 40 when included, to rotate between a substantially horizontal positioning as shown in FIGS. 1 and 2, to a substantially vertical positioning as shown in FIG. 3. The change in positioning of the starboard canard 38 will concurrently change the orientation of a the third rotor assembly 45 and the third motor or motor generator 46 engaged thereto. A concurrent change in positioning of a fourth rotor assembly 47 on the port canard 40 by rotation thereof, will change the orientation of a forth motor or motor generator 48 and propeller 14 engaged thereon.

Both the third motor generator 46 and the fourth motor generator 48, have a propeller 14 engaged thereto which has blades 16 thereon. As shown in FIGS. 1-2, both the starboard canard 38 and port canard 40 have been rotated by a canard actuator 44, to a substantially horizontal positioning substantially aligned with or running substantially parallel to the horizontal plane 36 for forward flight of the aircraft. Such a configuration may be employed for a runway take off and during forward flight. Of course, the canards can be rotated in their engagement to the actuator 44 at any time to run in any plane.

As shown in FIG. 3, both the starboard canard 38 and the port canard 40 have been rotated to a substantially vertical positioning wherein the third rotor assembly 45 and fourth rotor assembly 47 and propellers 14 and blades 16 thereon, rotate in a substantially horizontal plane, as with that of the propellers 14 on the first rotor assembly 11 and second rotor assembly 15. This configuration may be employed for vertical take off and landing of the aircraft, whereby the propellers 14 on all of the first motor generator 12 and second motor generator 13 and third motor generator 46 and fourth motor generator 48, will cause respective powered rotation to provide VTOL lift.

During a vertical landing of the aircraft, auto rotation of the propellers 14 which powers one or more of the first motor generator 12, second motor generator 13, third motor generator 46 and fourth motor generator 48, to spin, will cause electricity generation which can be communicated to the power supply 34 toward recharging it. Of course during flight the starboard canard 38 and port canard 40 can be rotated by the actuator 44 at the command of the controller 42 to steer the aircraft and/or change direction and/or altitude thereof as needed.

In FIG. 4, as noted, is shown an alternative configuration of the aircraft device 10 wherein the first wing 20 and second wing 24 are in more of a biplane configuration, rather than having the noted V-shaped configuration of the first wing 20 shown in FIGS. 1-3. Also as noted, any configuration as would occur to those skilled in the art having a first wing 20 positioned above a second wing 24, enabling the positioning of a first rotor assembly 11 and a second rotor assembly in-between curved wingtips 18 and 22, at both ends of both wings, is considered within the scope of this patent.

Figure 5:
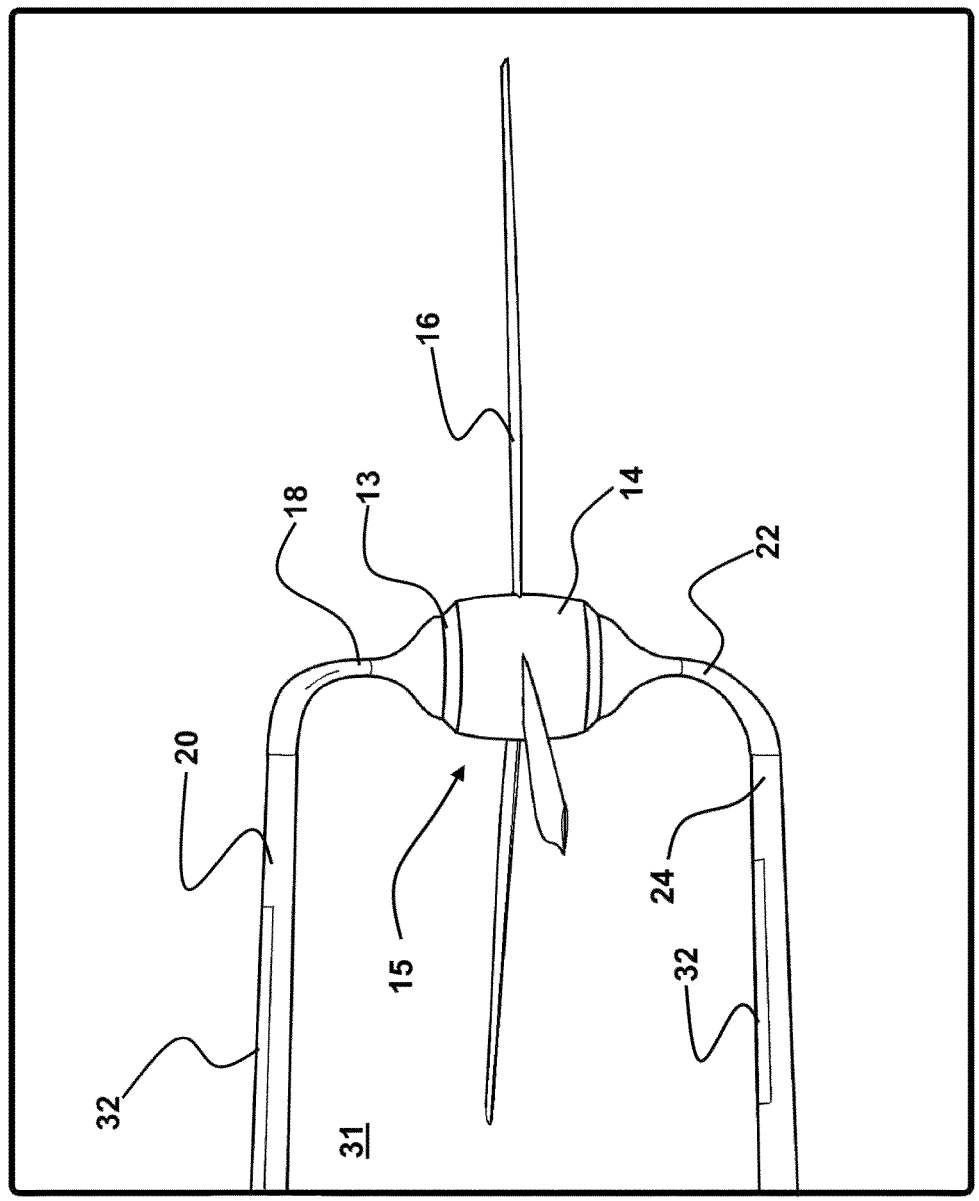
FIG. 5 shows the particularly preferred positioning of the second rotor with propellers engaged to a motor generator which are operatively connected to the curved wingtips of a first or overhead wing and a second wing located below, such by connections to a bearing and/or to the housing of the motor generator.

An enlarged view of the wingtip positioning of the second rotor assembly 15 having a second motor generator 13 having a bladed prop thereon, is shown in FIG. 5. As shown the first wing 20 has a first curved wingtip 18 which curves downward toward the second wing 24. Also shown, the second wing 24 has a second curved wingtip 22 which curves upward toward the overhead first wing 20. Operatively engaged with both the first wingtip 18 and second wingtip 22, is shown the second rotor assembly 15 having the second motor generator 13 as shown which is engaged with a propeller 14. The first rotor assembly 11 having the first motor generator 12 would be engaged to the wingtips 18 and 22, in the same fashion on the opposite end of the two wings.

Such an engagement of the curved wingtips to the rotor assemblies 11 and 15, for example may to an exterior housing of the motor generator 12 or 13, or to a bearing or other mount, which will hold the motor generator 12 or 13, in a fixed position, to thereby hold the propeller 14 and blades 16 extending therefore, in a fixed horizontal plane. Such allows the propeller 14, under power from the power source 34, to provide vertical thrust for vertical lift and to auto rotate during descent to slow descent and concurrently generate electricity. Further, this positioning allows the engaged propellers 14 to capture the force of vortexes generated at the wingtips during periods of forward flight to generate electric power for recharging the power supply 34.

Figure 6:
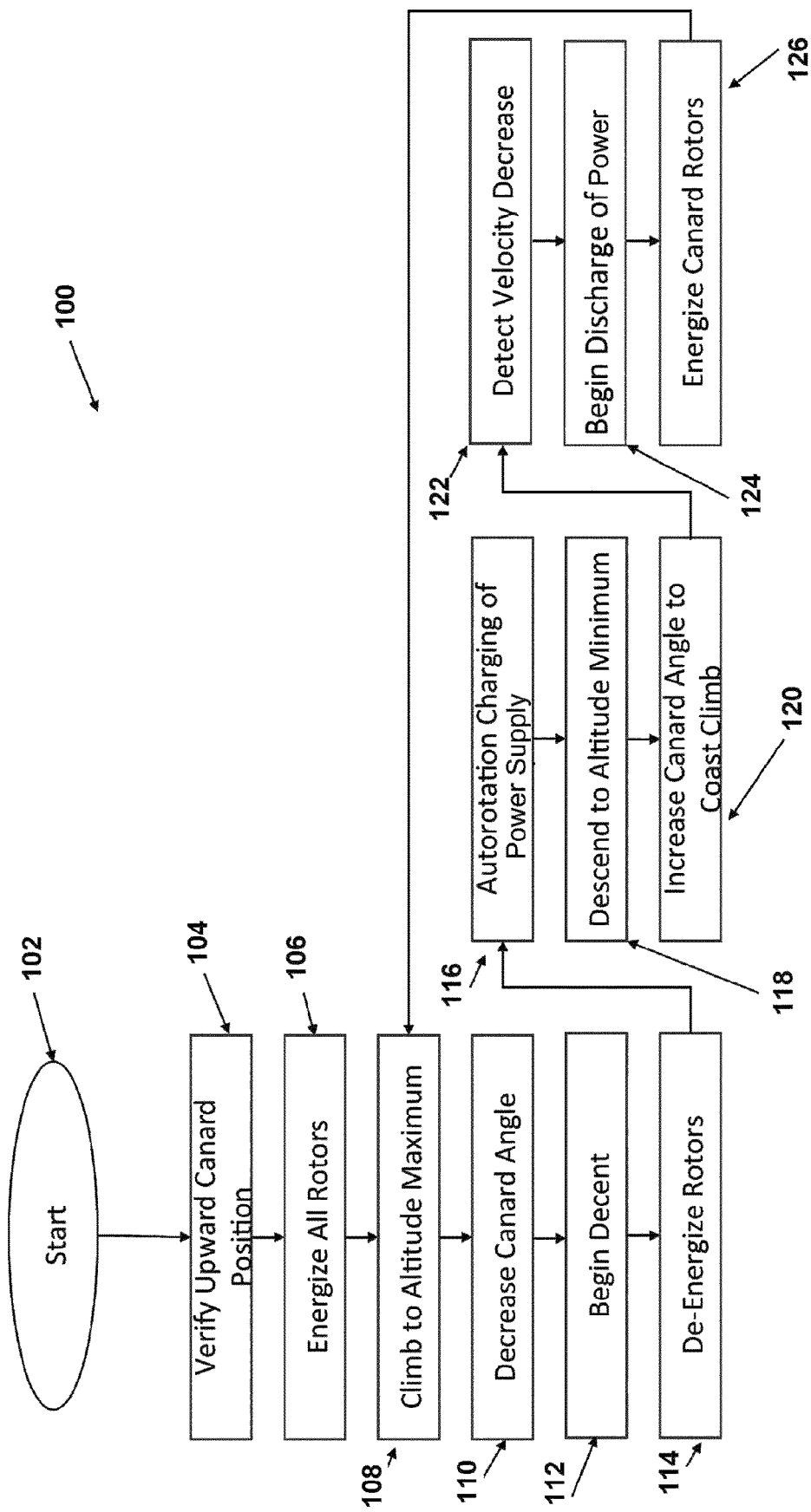
FIG. 6, depicts a typical mode of operation of the aircraft system herein during a vertical take off and landing.

FIG. 6 is an exemplar flowchart showing process 100 detailing steps in the operation of the canards 38 and 44, for VTOL operations, rotors and capacitor corresponding to the flight curve (curve 200 of FIG. 7) of aircraft 10 (FIGS. 1-5).

The process starts at step 102. At step 104, the upward orientation of the canards is verified. At step 106, all motor generators are energized to generate lift. The climb by the aircraft to a desired or advantageous altitude is achieved at step 108. The canard angle is decreased at step 110.

At step 112, the start of the aircraft descent begins. The motor generators are de-energized at step 114. Auto rotation of the wingtip positioned motor generators begins at step 116 resulting in charging of the power supply 34. At step 118, the aircraft descends to a desired or advantageous altitude. Once this desired or advantageous altitude is achieved, this is followed at step 120 by an increase in the angle of attack of the canards 38 and 40, to produce a climb in altitude of the aircraft resulting from the momentum of the aircraft. Prior to a velocity decrease being detected, such as by the controller 42 at step 122 for the aircraft, the discharge of the power supply 34 begins at step 124. Drive rotors are then energized at step 126 after which the aircraft climbs to an altitude maximum at step 108.

Figure 7:
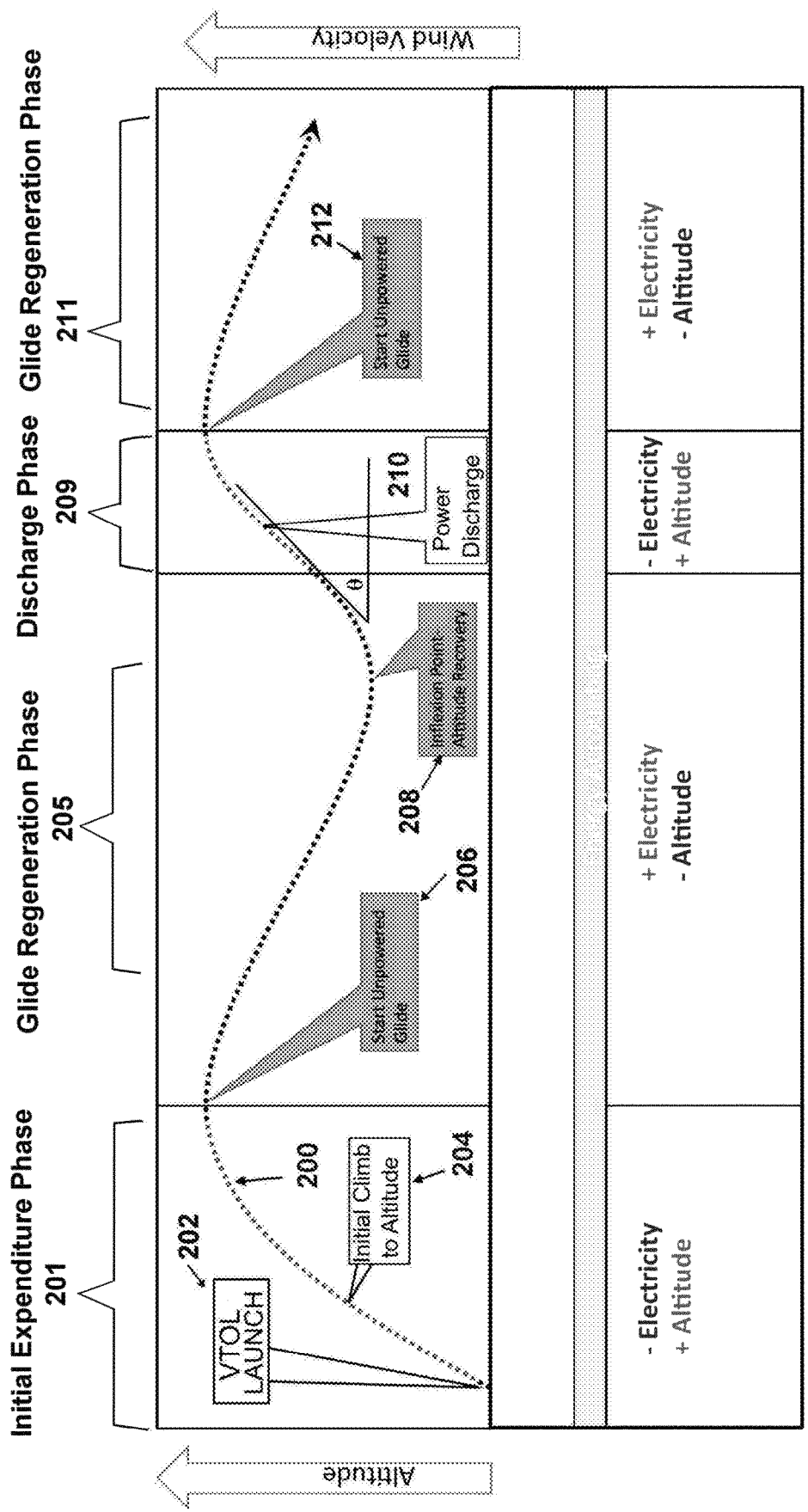
FIG. 7 shows a mode of the operation of the aircraft system herein, whereby vortex energy may be captured during forward flight and/or glide, to rotate the wingtip positioned propellers to generate electricity during periods of flight.

In FIG. 7 is shown an exemplar of a mode of the operation of the aircraft system 10 herein, whereby vortex and auto rotational energy is captured to rotate the wingtip positioned propellers to generate electricity for charging the power supply 34 during period of flight.

Curve 200 is shown through various stages of generating electricity in connection with an aircraft 10 (FIGS. 1-5) ascending or descending in altitude.

Phase 201 represents an initial expenditure phase which may correspond to aircraft 10 taking off from ground. During this phase, altitude is gained by an aircraft and electricity from the power supply 34 may be consumed by the aircraft.

Step 202 represents a segment/point on curve 200 that may correspond to the vertical take off or landing (VTOL) of aircraft 10.

Step 204 represents a segment on curve 200 that corresponds to the initial climb to altitude of aircraft 10.

Phase 205 represents a glide regeneration phase for an aircraft as described herein. During this phase, a drop in altitude is experienced in connection with regenerative power being generated as a consequence of auto rotating first motor generator 12 and second motor generator 13 during an angle of attack changing relative to external cross winds (starboard side main first motor generator 12 and port side second motor generator 13 (FIG. 1) to augment lift from the second wing 24 and the first wing 20, while producing electricity due to rotation. Additionally, the third motor generator 46 and fourth motor generator 48, may be de-energized to capture and store electricity generated from relative wind.

Step 206 represents a segment on curve 200 corresponding to the start of an unpowered glide.

Step 208 represents an inflexion point in curve 200 representing the beginning of an ascent of aircraft 10 of FIGS. 1-3, toward recovering altitude.

Phase 209 represents a power supply 34 discharge phase wherein energy from a power supply 34 such as a battery and/or a capacitor which may be charged onboard an aircraft may be used advantageously to power onboard operations on the aircraft. The power supply discharge segment on curve 200 corresponds to a segment on curve 200 presenting an advantageous slope or angle to maximize lift to drag, wing performance, additional cross wind electricity generation, etc. The gain or loss of altitude and the creation or use of electricity, by the onboard motor generators, are noted within each of the noted phase sections herein.

Phase 211 shows energy regeneration during a glide of the aircraft. Such can be enabled during an unpowered glide 212 wherein some or all of the motor generators are powered to rotate and generate electric power as described above.

The aircraft system herein, while disclosed for inclusion of motor generators engaged with respective propellers which are positioned in-between curved wingtips of two wings of an aircraft, has other applications, and one skilled in the art could discern such. The explication of the features of this invention does not limit the claims of this application, and, other applications developed by those skilled in the art upon reviewing this application are considered to be included in this invention.

It is additionally noted and anticipated that although the device is shown in its most simple form and potential configurations, various components and aspects of the disclosed wing system may be differently shaped or slightly modified when forming the invention herein. As such, those skilled in the art will appreciate the descriptions and depictions set forth in this disclosure are merely meant to portray examples of preferred modes of the curved wing system engaged with motor generators herein within the overall scope and intent of the invention, and are not to be considered limiting in any manner.

Further, while all of the fundamental characteristics and features of the invention have been shown and described herein, with reference to particular embodiments thereof, a latitude of modification, various changes and substitutions are intended in the foregoing disclosure as well as the claims which follow, and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An aircraft comprising:
   a fuselage having a front end and a rear end, said fuselage having a starboard side and having a port side opposite said starboard side;
   a first wing, said first wing positioned above a second wing;
   said first wing having a first wingtip positioned on said starboard side of said fuselage and having a second wingtip positioned on said port side of said fuselage;
   said second wing having a first wingtip on said starboard side of said fuselage, and having a second wingtip positioned on said port side of said fuselage;
   a first rotor assembly positioned in between a distal end of said first wingtip of said first wing and a distal end of said first wingtip of said second wing;
   a second rotor assembly positioned in between a distal end of said second wingtip of said first wing and a distal end of said second wingtip of said second wing;
   said first rotor assembly having a first propeller including a plurality of blades projecting radially therearound from respective engagements thereto, said first propeller being engaged with a first motor generator, said plurality of blades extending from said first propeller rotating in a horizontal plane in the same direction, said horizontal plane extending into a gap between said first wing and said second wing; and
   said second rotor assembly having a second propeller including a plurality of blades projecting radially therearound from respective engagements thereto, said second propeller being engaged with a second motor generator, said plurality of blades of said second propeller rotating in said horizontal plane in the same direction.

2. The aircraft of claim 1, additional comprising:
said first wingtip of said first wing on said starboard side of said fuselage curving toward said second wing;
said first wingtip of said second wing on said starboard side of said fuselage curving toward said first wing;
said second wingtip of said first wing positioned on said port side of said fuselage curving toward said second wing on said port side of said fuselage; and
said second wingtip of said second wing positioned on said port side of said fuselage curving toward said first wing on said port side of said fuselage.

3. The aircraft of claim 2 additionally comprising:
said first wing being V shaped;
a horizontal stabilizer engaged to said fuselage on a first end and extending to a distal end; and
said first wing having a central portion engaged with said distal end of said horizontal stabilizer.

4. The aircraft of claim 3 additionally comprising:
a starboard canard extending from a first end engaged with said starboard side of said fuselage, to a distal end thereof;
a port canard extending from a first end thereof engaged with said port side of said fuselage, to a distal end thereof;
a third rotor assembly positioned on said starboard canard, said third rotor assembly having a third motor generator engaged with a propeller;
a fourth rotor assembly positioned on said port canard, said fourth rotor assembly having a fourth motor generator engaged with a propeller.

5. The aircraft of claim 2 additionally comprising:
a starboard canard extending from a first end engaged with said starboard side of said fuselage, to a distal end thereof;
a port canard extending from a first end thereof engaged with said port side of said fuselage, to a distal end thereof;
a third rotor assembly positioned on said starboard canard, said third rotor assembly having a third motor generator engaged with a propeller;
a fourth rotor assembly positioned on said port canard, said fourth rotor assembly having a fourth motor generator engaged with a propeller.

6. The aircraft of claim 1 additionally comprising:
said first wing being V shaped;
a horizontal stabilizer engaged to said fuselage on a first end and extending to a distal end; and
said first wing having a central portion engaged with said distal end of said horizontal stabilizer.

7. The aircraft of claim 6 additionally comprising:
a starboard canard extending from a first end engaged with said starboard side of said fuselage, to a distal end thereof;
a port canard extending from a first end thereof engaged with said port side of said fuselage, to a distal end thereof;
a third rotor assembly positioned on said starboard canard, said third rotor assembly having a third motor generator engaged with a propeller;
a fourth rotor assembly positioned on said port canard, said fourth rotor assembly having a fourth motor generator engaged with a propeller.

8. The aircraft of claim 1 additionally comprising;
a starboard canard extending from a first end engaged with said starboard side of said fuselage, to a distal end thereof;
a port canard extending from a first end thereof engaged with said port side of said fuselage, to a distal end thereof;
a third rotor assembly positioned on said starboard canard, said third rotor assembly having a third motor generator engaged with a propeller;
a fourth rotor assembly positioned on said port canard, said fourth rotor assembly having a fourth motor generator engaged with a propeller.

* * * * *